United States Patent

Boon et al.

Patent Number: 5,227,948
Date of Patent: Jul. 13, 1993

[54] ELECTROMAGNETIC SUPPORT WITH POSITION-INDEPENDENT CHARACTERISTICS

[75] Inventors: Fidelus A. Boon, Eindhoven; Hendrikus H. M. Cox, Eindhoven, both of Netherlands

[73] Assignee: U.S. Philips Corporation, New York, N.Y.

[21] Appl. No.: 664,162

[22] Filed: Mar. 4, 1991

[30] Foreign Application Priority Data

Aug. 30, 1990 [NL] Netherlands ............... 9001908

[51] Int. Cl.$^5$ ............................ H02N 15/00
[52] U.S. Cl. ..................... 361/144; 310/90.5; 361/146; 324/207.11
[58] Field of Search ............. 310/90.5; 324/207.11, 324/207.12, 207.13; 361/139, 143, 144, 146

[56] References Cited

U.S. PATENT DOCUMENTS

| | | | |
|---|---|---|---|
| 4,737,823 | 4/1988 | Bouwer et al. | 355/53 |
| 4,795,927 | 1/1989 | Morii et al. | 310/90.5 |
| 5,013,987 | 5/1991 | Wakui | 310/90.5 |
| 5,066,879 | 11/1991 | Yamomura | 310/90.5 |
| 5,093,754 | 3/1992 | Kawashima | 361/144 |

*Primary Examiner*—Jeffrey A. Gaffin
*Attorney, Agent, or Firm*—Paul R. Miller

[57] ABSTRACT

A device for positioning a body (5) by means of at least two electromagnets (13, 15). A position sensor (29) measures the size of an air gap (23) between one of the electromagnets (13, 15) and a guide beam (1). An output signal of the position sensor (29) is applied to an electronic control unit (35) which passes a control current through the electromagnets (13, 15) in dependence on a difference between the measured and a desired size of the air gap (23). An electronic multiplier (47, 59) is connected between the control unit (35) and each of the electromagnets (13, 15), multiplying a control signal from the control unit (35) by the output signal from the position sensor (29). In this way a force exerted by the electromagnets (13, 15) on the guide beam (1) depends exclusively on the value of the control signal and not on the size of the air gap (23), so that a position-independent control is obtained. Such an accurate position-independent control may be used in an optical lithographic device for the irradiation of semiconductor substrates. Alternatively, such an electromagnetic support with a position-independent control may be constructed so as to form a micromanipulator.

15 Claims, 4 Drawing Sheets

ELECTROMAGNETIC SUPPORT WITH POSITION-INDEPENDENT CHARACTERISTICS

FIELD OF INVENTION

The invention relates to a device for positioning a body in at least one support direction by means of at least one electromagnet and at least one position sensor, an electrical output of the position sensor being connected to an electrical input of an electronic control unit with which an electric current in the electromagnet is controllable as a function of a difference between a position of the body relative to the electromagnet as measured by the position sensor and a desired position.

Of interest are commonly owned copending applications Ser. No. 664,074 entitled "Electromagnetic Support with Unilateral Control Currents" in the name of Cox et al and Ser. No. 664,075 entitled "Electromagnetic Support with Current-Independent Characteristics" in the name of van Eijk et al both filed concurrently with the instant application.

BACKGROUND OF THE INVENTION

Philips Technical Review, vol. 41, no. 11/12, 1983/84, pp. 348-361, discloses a device of the kind described in the opening paragraph in which a shaft is supported by five pairs of electromagnets in such a way that rotation of the shaft is possible only about the centerline of the shaft. A force exerted on the shaft by an electromagnet is substantially directly proportional to the square of the value of the current through the electromagnet and substantially inversely proportional to the square of the size of an air gap between the electromagnet and the shaft. As a result of the relation between the electromagnetic force and the size of the air gap, the position of the shaft relative to the electromagnets is not stable unless additional measures are taken. To maintain a stable desired position of the shaft in the known device, the position of the shaft relative to each pair of electromagnets is measured by means of a position sensor, and a control current determined from the difference between the measured and the desired position is passed through the two electromagnets of the relevant pair. The value of the control current is thereby determined by means of a control unit having a proportional, differentiating and integrating action (PID controller). A stable support is obtained through the electromagnets controlled by the PID controller.

Since there is a non-linear relation between the electromagnetic force and the size of the air gap and the value of the current, the known device constitutes a non-linear system. The PID controller used is a linear control unit which in the known device is optimized for a working point determined by a desired size $h_0$ of the air gap and by a basic current $i_0$ through the electromagnets. As a result, however, a number of characteristics of the support which also determine the stability of the support, such as stiffness and bandwidth, are dependent on the position of the shaft relative to the electromagnets, whereas the PID controller used functions optimally only in the case of relatively small displacements of the shaft from the desired position. It is a disadvantage of the known device, accordingly, that only one position of the shaft is optimally stable, whereas any other position of the shaft is less stable, or may even be unstable. Stability problems can thus occur, especially upon switching on of the support device.

SUMMARY OF THE INVENTION

The invention has for its object to provide a device for positioning a body in which the stiffness and bandwidth are independent of the position of the body relative to the electromagnets, so that the disadvantages described above are avoided.

The invention is for this purpose characterized in that between an electrical output of the control unit and the electromagnet controlled by the control unit an electronic multiplier is connected which is unique to the relevant electromagnet, an output signal of the multiplier being determined by the product of a control signal of the control unit and an output signal of the position sensor.

It is achieved through the use of the electronic multiplier between the control unit and the electromagnet controlled by the control unit that the current through the relevant electromagnet is proportional both to the control signal of the control unit and to the size of the air gap of the elctromagnet. Thus the force exerted by the relevant electromagnet is proportional only to the square of the control signal of the control unit and substantially independent of the size of the air gap of the relevant electromagnet, so that the stiffness and bandwidth of the device are independent of the position of the body and the control unit can function optimally in any position of the body (positional independence of the control). The invention also achieves that the body to be supported can be accurately displaced relative to the electromagnet by means of the device.

In a device of the kind described in the opening paragraph, with a control unit optimized for a working point ($h_0$, $i_0$), the stiffness and bandwidth are also dependent on the value of the basic current $i_0$, while the control unit functions optimally only in the case of small loads on the body, i.e. when the control currents through the electromagnets are small in relation to the basic current. A particular embodiment of the device according to the invention is characterized in that an electronic root extractor is connected between the control unit and the multiplier connected to the control unit. The use of the electronic root extractor achieves that the current through the electromagnet controlled by the control unit is proportional to the square root of the control signal of the control unit. In this way the force exerted by the relevant electromagnet is proportional to the value of the control signal, so that the stiffness and bandwidth of the device are independent of the value of the current through the electromagnet and the control unit functions optimally for all loads on the body to be supported (current independence of the control).

A further embodiment of a device according to the invention, in which during operation the body is supported in the support direction by means of a pair of electromagnets which, seen in the support direction, are located opposite one another, while the currents through the two electromagnets of the pair are controlled by a control unit which is common to the two electromagnets of the pair, is characterized in that between the control unit and each of the two multipliers connected to the control unit an electronic root extractor is connected which is unique to the relevant multiplier. This embodiment provides a bilateral support of the body with a high loading capability in that that electromagnet, whose air gap has increased as a result of a displacement of the body from the desired position owing to a static load, is supplied with a control current having a direction equal to that of the basic current, while the other electromagnet is supplied with control current having a direction opposite to that of the basic current. In addition to a position-independent control, a current-independent control is also achieved through the use of the said unique root extractors.

A yet further embodiment of a device according to the invention, in which again a pair of electromagnets and a control unit common to this pair are used, is characterized in that between the control unit and each of the two multipliers connected to the control unit an electronic rectifier is connected which is unique to the relevant multiplier, the two rectifiers being electrically oppositely directed. In this embodiment the electromagnets are supplied with a control current only, not with a basic current. It is achieved through the use of the said rectifiers that, in the case of a displacement of the body from the desired position owing to a static load on the body, only that electromagnet is supplied with a current whose air gap has been increased as a result of this displacement. The electrical resistance losses of the electromagnets are kept low in this way.

A further embodiment of a device according to the invention, in which the rectifiers are connected in an efficient manner relative to the multipliers, is characterized in that the rectifiers are connected between the control unit and each of the multipliers connected to the control unit. It is achieved by this that an input signal of each of the multipliers always has a same polarity, so that an unstable operation of the multipliers around the zero crossing of the input signal is avoided.

A special embodiment of a device according to the invention, which provides a control of the electromagnets which is independent of the current value, while the rectifiers referred to above are used, is characterized in that between the control unit and each of the two multipliers connected to the control unit an electronic root extractor is connected which is unique to the relevant multiplier. A finite stiffness is obtained also in a no-load condition of the body through the use of the root extractors.

A further embodiment of a device according to the invention, which provides a control independent of the value of the current with a simple construction, while the said rectifiers are used, is characterized in that between the control unit and the two multipliers connected to the control unit an electronic root extractor is connected which is common to the two multipliers.

A still further embodiment of a device according to the invention is characterized in that a digital memory is connected between each of the multipliers and the position sensor connected to the relevant multiplier. The use of a digital memory between the position sensor and the multiplier can effectively convert the output signal of the position sensor into a signal whose value is proportional to the size of the air gap between the body and the electromagnet connected to the relevant multiplier. In addition, the output signal of the position sensor can be corrected by the digital memory for non-linear effects such as, for example, magnetic saturation of the electromagnets or the body to be supported.

IN THE DRAWING

The invention will be explained in more detail with reference to the drawing, in which:

FIG. 1 is a lateral elevation of a common portion of a first and a second embodiment of a device according to the invention, FIG. 2 is a plan view of the common portion according to FIG. 1, FIG. 3 is a cross-section of the common portion taken on the line III—III in FIG. 2, FIG. 4 diagrammatically shows the first embodiment of the device according to the invention comprising a first electronic control circuit, and FIG. 5 diagrammatically shows the second embodiment of the device according to the invention comprising a second electronic control circuit.

DESCRIPTION OF THE PREFERRED EMBODIMENTS

Figure 1:
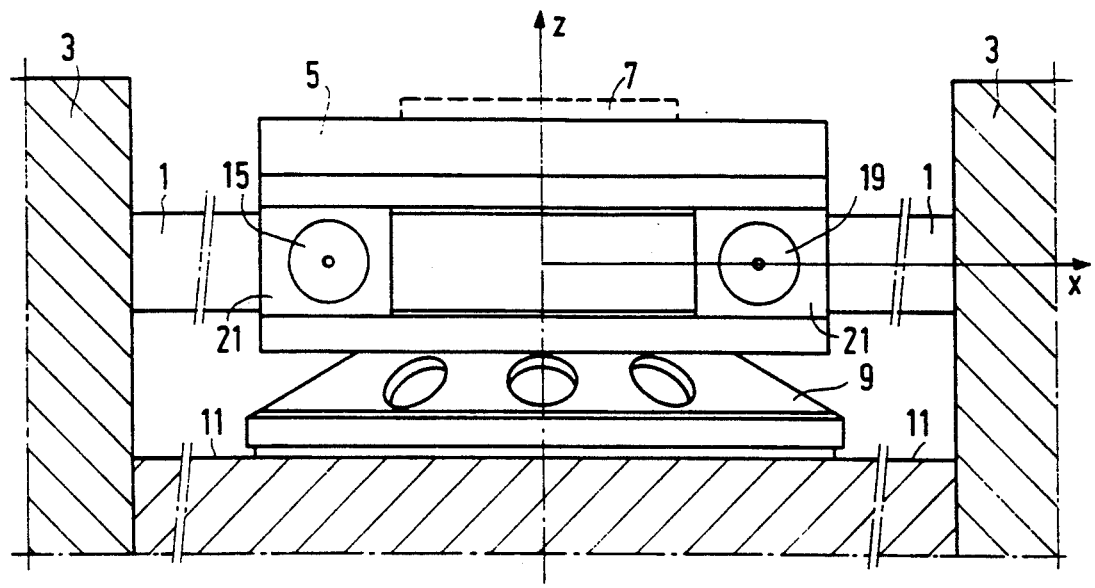

The devices illustrated in FIGS. 1 to 5 comprise a straight guide with a steel guide beam 1 which extends in a horizontal direction parallel to the x-direction in FIG. 1 and which is mounted to a frame 3 near both its ends, a table 5 being displaceable in the x-direction along the guide beam 1. An object 7 (shown in dashed lines) fastened to the table 5 can be positioned in the x-direction by driving means not shown in any detail in the FIGS.

The table 5 is provided with a round, aerostatically supported foot 9 of a kind known from Netherlands Patent Application 8902472 which corresponds to commonly owned copending application Ser. No. 594,519 filed Oct. 4, 1990 in the name of Engelen et al. Of further interest is commonly owned U.S. Pat. No. 4,737,823. During operation, the foot 9 has its support on a granite base surface 11 by means of a static gas bearing of a type known per se pretensioned with an underpressure, which base surface 11 extends in a horizontal plane parallel to the x-direction and to a horizontal y-direction which is perpendicular to the x-direction (see FIG. 2). The use of the aerostatically supported foot 9 in combination with the base surface 11 prevents a translation of the table 5 in a z-direction perpendicular to the base surface 11 as well as a rotation of the table 5 about an axis of rotation which extends parallel to the x-direction or y-direction.

Figure 2:
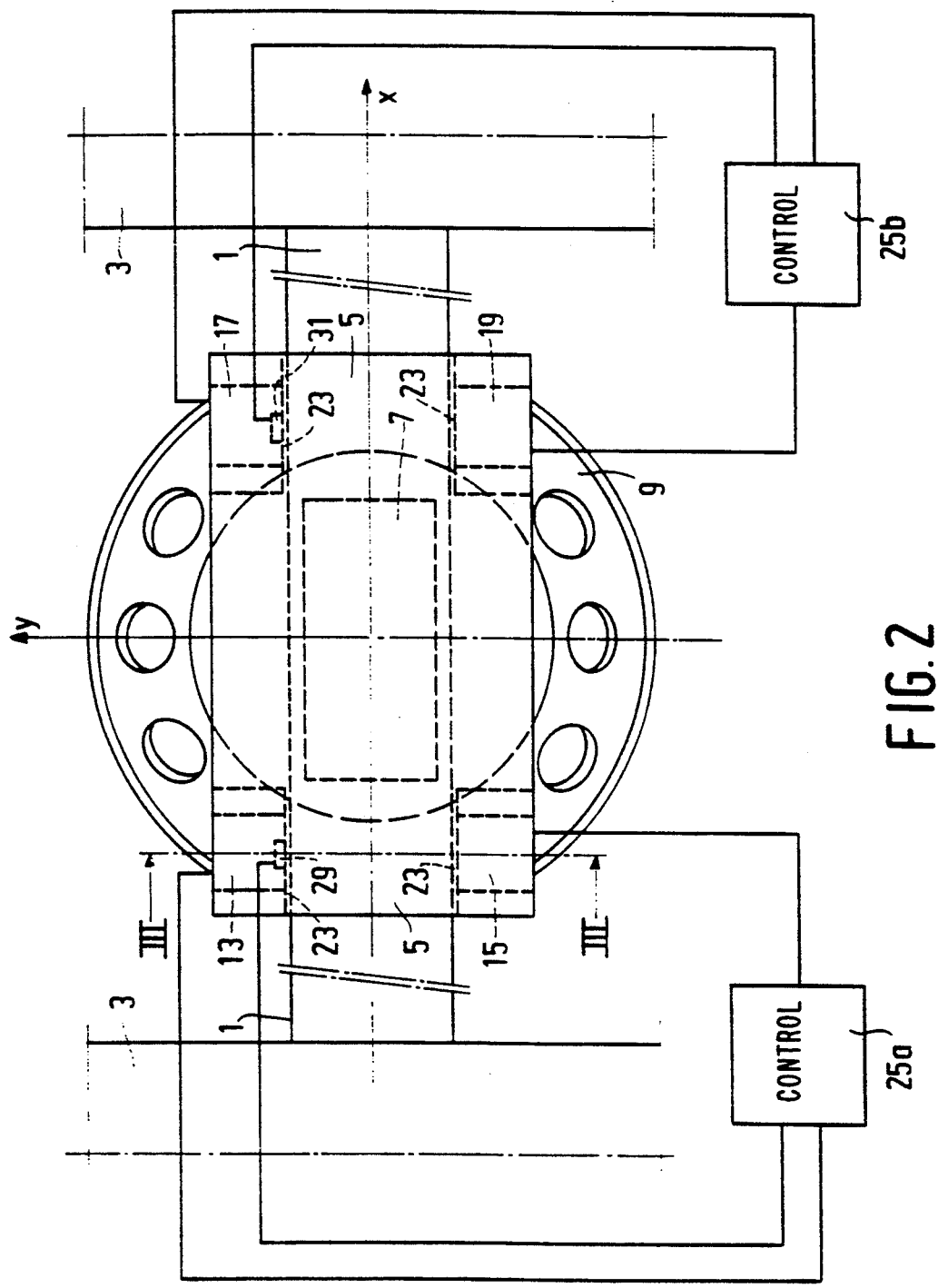

A translation of the table 5 parallel to the y-direction and a rotation of the table 5 about an axis of rotation parallel to the z-direction are prevented through the use of two pairs of electromagnets (13, 15) and (17, 19), these two pairs being fastened at some distance from one another in a bearing block 21 provided between the table 5 and the foot 9 and surrounding the guide beam 1 (see FIGS. 1 and 2). As can be seen in FIG. 2, the two electromagnets (13, 15) and (17, 19) of each pair are located opposite one another on either side of the guide beam 1, seen in the y-direction.

When an electric current is passed through the electromagnets 13, 15, 17, 19, each of the electromagnets 13, 15, 17, 19 will exert an attracting electromagnetic force on the steel guide beam 1. The extent of this force is substantially directly proportional to the square of the value of the current through the relevant electromagnet 13, 15, 17, 19, and substantially inversely proportional to the square of the size of an air gap 23 between the relevant electromagnet 13, 15, 17, 19 (see FIG. 2) and the guide beam 1. As a result of the relation between the electromagnetic force and the size of the air gap 23, an equilibrium condition, in which the attracting forces of the two electromagnets of each pair (13, 15) and (17, 19) are equal, will be unstable if the current through the electromagnets 13, 15, 17, 19 is a constant, non-controlled current. For, if the table 5 is displaced from the equilibrium position over a small distance parallel to the y-direction, the attracting forces of the electromagnets whose air gaps 23 are made smaller by the displacement will increase and the attracting forces of the electromagnets whose air gaps 23 are made wider by the displacement will decrease. A resultant force in the direction of the displacement follows, so that the displacement will be further increased.

In order to obtain a stable support in the y-direction, the current through the electromagnets of the pairs (13, 15) and (17, 19) is controlled by means of respective electronic control circuits 25a and 25b (see FIG. 2). The control circuits 25a and 25b are identical. Each of the two pairs of electromagnets (13, 15) and (17, 19) is provided with a contactless capacitive position sensor 29, 31 of a kind known per se which is fitted in one of the two electromagnets of the relevant pair (13, 15), (17, 19) (see FIG. 2). During operation, each of the position sensors 29, 31 measures the size of the air gap 23 between the guide beam 1 and the electromagnet 13, 17 in which the relevant position sensor 29, 31 is fitted. The control circuits 25a, 25b compare the measured sizes of the two air gaps 23 with a desired size and pass control currents through the electromagnets 13, 15, 17, 19 whose values depend on the difference between the desired and the measured sizes, so that the measured size becomes equal to the desired size under the influence of the electromagnetic forces exerted on the guide beam 1. The operation and characteristics of the control circuits 25a, 25b will be further explained below.

Figure 4:
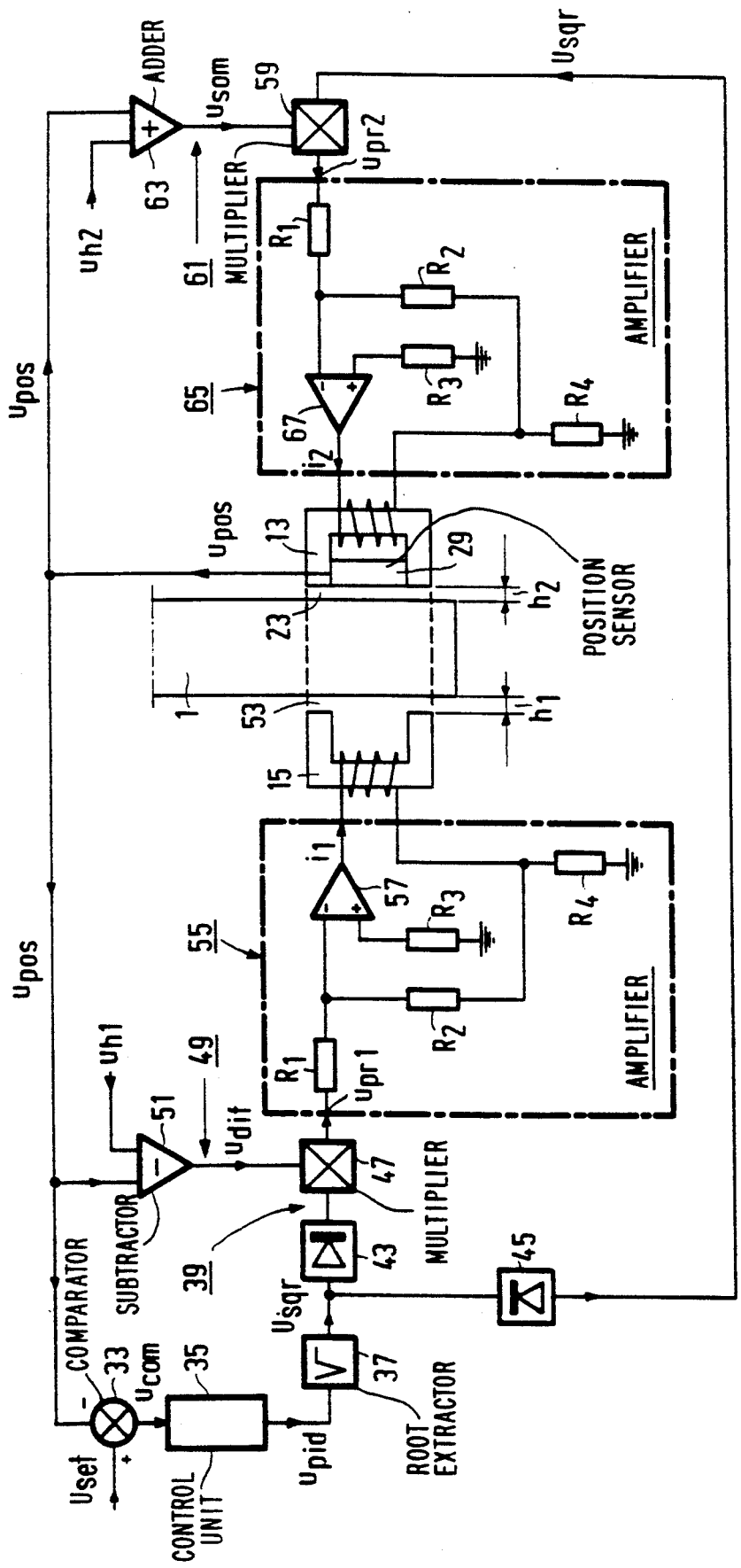

FIG. 4 diagrammatically shows a first embodiment of the electronic control circuit 25a, circuit 25a being representative. An electrical output of the relevant position sensor 29, 31 in each control circuit 25a, 25b is connected to a first electrical input of a summation circuit which acts as a comparator 33. An output signal $u_{pos}$ (voltage signal) of the position sensor 29, 31, the value of which depends on the size of the air gap 23, is compared by the comparator 33 with an input signal $u_{set}$ of a second electrical input of the comparator 33, the value of which depends on the desired size of the air gap 23. An output signal $u_{com}$ of the comparator 33 is equal to the difference $u_{set} - u_{pos}$ of the two input signals of the comparator 33. The signal $u_{com}$ forms an input signal for an electronic control unit 35. The control unit 35 is a PID controller which is known per se and which is of a usual type having a proportional, integrating and differentiating control action, transforming the signal $u_{com}$ into a control signal $u_{pid}$ (voltage signal) which determines the value of the current through the electromagnets 13 and 15.

Such a PID controller unit is a linear control unit and is accordingly particularly suitable for use in a linear system. As was stated above, the electromagnetic force is a non-linear force, so that the support of the table 5 by means of the electromagnets 13, 15, 17, 19 forms a non-linear system. In the known device described in the introduction, which forms a non-linear system for the same reason, the use of a PID controller is made possible in that the non-linear system is linearized around a working point which is determined by a desired size $h_o$ of the air gap and a basic current $i_o$ through the electromagnets. The characteristics of the support, however, such as the stiffness, the damping and the bandwidth, are then dependent on $h_o$ and $i_o$. Therefore, an optimal position control is obtained with the PID controller used only if the displacements $\Delta h$ are small in relation to $h_o$ and if the control currents $\Delta i$ are small in relation to $i_o$.

In the control circuit 25a shown in FIG. 4, the control signal $u_{pid}$ is applied to an electronic root extractor 37 of a type known per se. An output signal $u_{sqr}$ of the root extractor 37 has a value equal to the square root of the value of the signal $u_{pid}$, while the sign (polarity) of the signal $u_{sqr}$ is the same as that of the signal $u_{pid}$:

$$u_{sqr} = \frac{|u_{pid}|}{|u_{pid}|} \cdot \sqrt{|u_{pid}|}$$

An electrical output of the root extractor 37 is connected to the electromagnet 15 via a first branch 39 of the control circuit 25, and to the electromagnet 13 via a second branch 41 of the control circuit 25. The branches 39 and 41 are provided with an electronic rectifier 43 and an electronic rectifier 45, respectively. The rectifiers 43 and 45, which both operate as diodes, are of a conventional type and may be of analog design (a comparator circuit with a half-wave rectification action), or of digital design (a logic circuit). The rectifiers 43 and 45 are electrically oppositely directed relative to the signal $u_{sqr}$, so that they conduct the signal $u_{sqr}$ each in a different direction. The function of the rectifiers 43, 45 in the control circuit 25a will be further explained below.

The first branch 39 comprises an electronic multiplier 47 of a conventional kind. A first input of the multiplier 47 is connected to the output of the root extractor 37 via rectifier 43, while a second input of the multiplier 47 is connected to the output of the position sensor 29 (or 31) via a feedback line 49 of the control circuit 25. A subtractor circuit 51 is included in the feedback line 49 with a first electrical input which receives a constant input signal $u_{h1}$ and a second electrical input which receives the signal $u_{pos}$ from the position sensor 29 (or 31). The signal $u_{h1}$ in this case is equal to the sum $u_0 + u_{c1}$ of a reference signal $u_0$, which is proportional to an average size of an air gap 53 between the guide beam 1 and the electromagnet 15, and a correction signal $u_{c1}$, whose value is determined by a number of characteristics of the electromagnet 15, such as the magnetic permeability of the iron used for the electromagnet 15 and the length of the magnet iron circuit used. An output signal $u_{dif}$ of the subtractor circuit 51 is a difference $u_{h1} - u_{pos}$ of the two input signals $u_{h1}$ and $u_{pos}$ of the subtractor circuit 51 and is determined by the size $h_1$ of the air gap 53. The signal $u_{dif}$ is multiplied by the signal $u_{sqr}$ in the multiplier 47, so that an output signal $u_{pr1}$ of the multiplier 47 is determined by the product $u_{sqr} \times u_{dif}$.

The output signal $u_{pr1}$ of the multiplier 47 forms an input signal for an amplifier unit 55 of a type known per se, which is provided with an operational amplifier 57. The voltage signal $u_{pr1}$ is amplified by the amplifier unit 55 to a control current $i_1$ through the electromagnet 15.

The second branch 41 of the control circuit 25 comprises an electronic multiplier 59 with a first input which is connected to the root extractor 37 via the rectifier 45, and with a second input which is connected to the position sensor 29 (or 31) via a feedback line 61 of the control circuit 25a. The feedback line 61 includes an adder circuit 63 with a first electrical input receiving a constant input signal $u_{h2}$ and a second electrical input receiving the signal $u_{pos}$ from the position sensor 29, 31. The signal $u_{h2}$ is comparable to the signal $u_{c1}$ and is a correction signal whose value depends on a number of characteristics of the electromagnet 13, such as the magnetic permeability of the magnet iron used in the electromagnet 13 and the length of the magnet iron circuit used. An output signal $u_{sum}$ of the adder circuit 63 is equal to the sum $u_{h2} + u_{pos}$ of the two input signals $u_{h2}$ and $u_{pos}$ of the adder circuit 63 and is determined by the size $h_2$ of the air gap 23. The signal $u_{sum}$ is multiplied by the signal $u_{sqr}$ in the multiplier 59, so that an output signal $u_{pr2}$ of the multiplier 59 is the result of the multiplication $u_{sqr} \times u_{sum}$.

The output signal $u_{pr2}$ of the multiplier 59 forms an input signal for an amplifier unit 65 which is of a type similar to the amplifier unit 55 and which is provided with an operational amplifier 67. The voltage signal $u_{pr2}$ is amplified to a control current $i_2$ through the electromagnet 13 by the amplifier unit 65.

The approximate values of the forces $F_1$ and $F_2$ exerted by the electromagnets 15 and 13 on the guide beam 1 can be written as follows:

$$F_1 \sim \frac{i_1^2}{h_1^2} \text{ and } F_2 \sim \frac{i_2^2}{h_2^2}$$

$h_1$ and $h_2$ are the air gaps as shown in FIG. 4 between the electromagnets and the guide beam 1.

The following holds for the control currents $i_1$ and $i_2$ and the size of the air gaps $h_1$ and $h_2$:

$i_1 \sim u_{sqr} \times u_{dif}$ and $h_1 \sim u_{dif}$ $i_2 \sim u_{sqr} \times u_{sum}$ and $h_2 \sim u_{sum}$ Accordingly, it is true for the forces $F_1$ and $F_2$:
$F_1 \sim u^2_{sqr} \sim u_{pid}$ and $F_2 \sim u^2_{sqr} \sim u_{pid}$ The use of the multipliers 47 and 59 insures that the values of the forces $F_1$ and $F_2$ have become independent of the sizes of the air gaps $h_1$ and $h_2$ and are dependent on the value of the control signal $u_{pid}$ only. Thus an optimal position control can be achieved with the control unit 35 for any size of the air gap 23, so that an optimal stability is achieved for any position of the guide beam 1 relative to the electromagnets 13, 15. An advantage of this positional independence of the control is that starting of the device can take place without problems. In addition, the control will always provide an optimally stable operation of the device in the case of sudden, relatively high peak loads on the table 5.

The use of the root extractor 37 in conjunction with the multipliers 47 and 59 insures that the values of the forces $F_1$ and $F_2$ are proportional to the value of the control signal $u_{pid}$, so that the control unit 35 in fact governs a linear system, while also an optimal position control is achieved by the control unit 35 at any value of the control currents $i_1$ and $i_2$ through the electromagnets 13 and 15. An advantage of this control is that a basic current through the electromagnets 13, 15 is unnecessary. The control circuit 25a (and 25b) shown in FIG. 4 in fact only passes control currents through the electromagnets 13, 15, (and 17, 19) which renders the use of the rectifiers 43 and 45 necessary. Indeed, since a force exerted by one of the two electromagnets 13, 15 on the guide beam 1 is always an attracting force, irrespective of the direction of the control current through the relevant electromagnet, the forces of the two electromagnets 13, 15 without the use of the rectifiers 43, 45 would be permanently the same, and a position control would not be possible. Thanks to the use of the rectifiers 43, 45, the electromagnet 13 only is provided with a control current $i_2$ having a direction as indicated in FIG. 4 in the case of a static load on the table 5, while $i_1$ is equal to zero, if the measured size of the air gap 23 is greater than the desired size. With such a load, the electromagnet 15 only is provided with a control current $i_1$ having a direction as indicated in FIG. 4, while $i_2$ is equal to zero, if the measured size of the air gap 23 is smaller than the desired size. Since a basic current through the electromagnets 13, 15 is absent, and only one of the electromagnets 13, 15 receives a control current, the electrical resistance losses of the electromagnets 13, 15 are low. The resistance losses in a no-load condition of the table 5 are negligibly small.

Figure 5:
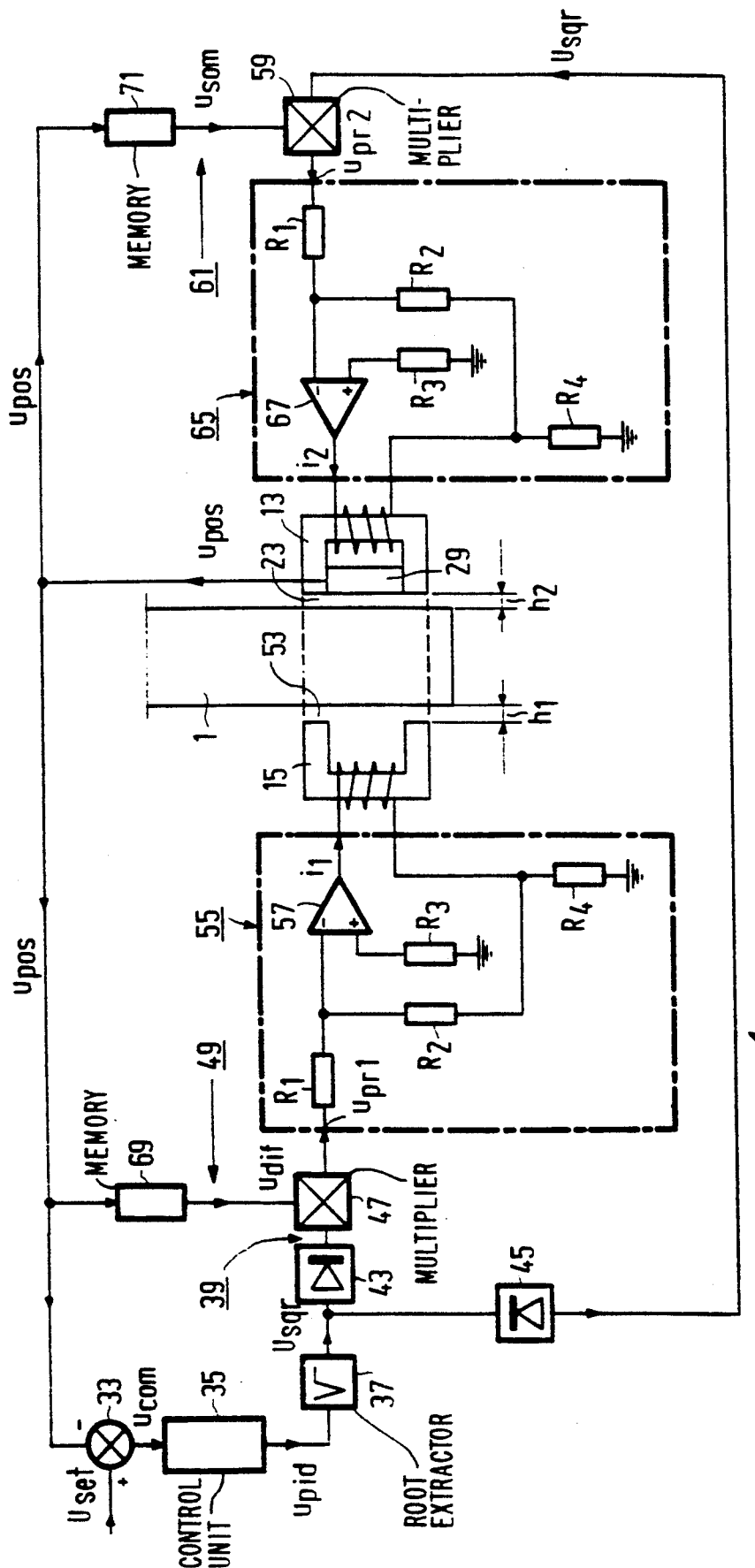

FIG. 5 diagrammatically shows a second embodiment of the control circuit 25a. In each control circuit 25a (and 25b) according to FIG. 5, the subtractor circuit 51 and the adder circuit 63 are replaced by a first digital memory 69 and a second digital memory 71, respectively. A relation between the signal $u_{pos}$ and the signals $u_{dif}$ and $u_{sum}$, respectively, for a number of consecutive values of $u_{pos}$ differing by a step size $\Delta u_{pos}$ is stored in tabular form in the memories 69 and 71. If the step size $\Delta u_{pos}$ is small enough, the functions of the digital memories 69, 71 in the control circuit according to FIG. 5 approximate the functions of the subtractor circuit 51 and the adder circuit 63, respectively, in the control circuit according to FIG. 4. Moreover, the signals $u_{dif}$ and $u_{sum}$ are corrected by the respective digital memories 69, 71 for non-linear characteristics of the electromagnets 13, 15 and of the guide beam 1, such as, for example, magnetic saturation.

Figure 3:
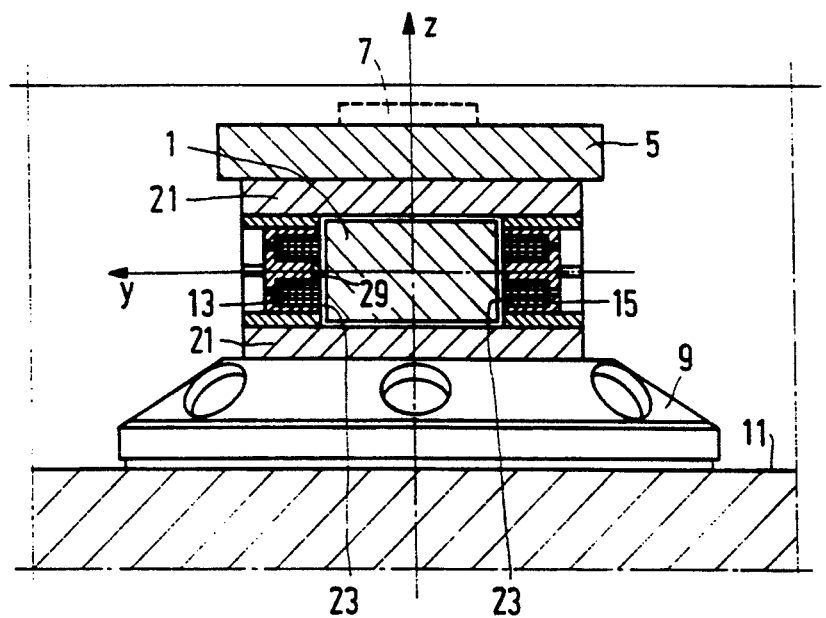

It should be noted that the devices shown in FIGS. 1, 2 and 3 comprising control circuits 25a (and 25b) according to FIGS. 4 or 5 are eminently suitable for application in an optical lithographic positioning device for the manufacture of masks to be used in the production of integrated circuits. Dimensional inaccuracies can arise in such positioning devices, and in other precision machines with electromagnet supports, as a result of heat generation in the electromagnets. Such inaccuracies can be avoided through the use of a device according to FIGS. 4 or 5. In addition, very small air gaps can be used by virtue of the accuracy and the position-independent characteristics of the said devices, such as stiffness and bandwidth, which renders possible a reduction in the required control current values and the accompanying resistance losses.

It should further be noted that the electronic root extractor 37 and the rectifiers 43 and 45 may be omitted in the control circuits 25a, 25b if no particular requirements are imposed on the heat generation in the electromagnets. A position-independent control is then obtained whereby a basic current with a superimposed control current flows through the electromagnets. The stiffness and bandwidth are then dependent on the strength of the basic current.

A still further embodiment is obtained in that only the rectifiers 43, 45 are omitted in the control circuits 25a, 25b. In this embodiment the electromagnets are also supplied with a basic current, while a root extractor has to be included in each branch 39, 41 before the relevant multiplier 47, 59 in order to obtain a control independent of the current value. The control signal $U_{pid}$, which determines the control currents through the electromagnets 13, 15, should then be added to and subtracted from a basic signal $U_0$, which determines the basic current through the electromagnets, before the relevant root extractor in the branches 39, 41, respectively. In this way a bilateral support with position-independent and current-independent characteristics is obtained in the relevant support direction.

It should also be noted that the electronic components shown in FIGS. 4 and 5 may each be replaced by a digital circuit which has a corresponding operation. Thus, for example, the control unit 35, the root extractor 37 and the two rectifiers 43, 45 may be replaced by an electronic control unit in which the functions of the control unit 35, the root extractor 37 and the rectifiers 43, 45 are united.

It is pointed out that the devices comprising control circuits 25a, 25b according to FIGS. 4 or 5 are particularly suitable for use in a micromanipulator by which the body to be supported can be accurately displaced over small distances (a few tens of microns). Since such a device has a position-independent control, an optimal stability is achieved in every position of the body to be supported.

It is further pointed out that a simple embodiment of the device is obtained in that only one of the two electromagnets 13, 15 is controlled in conjunction with a basic current. The other electromagnet in this embodiment is provided with a basic current only and serves exclusively as a counterbalancing magnet. A counterbalancing force may also be achieved by other means such as, for example, vacuum, a permanent magnet, a gas spring or a mechanical spring. The force of gravity acting on the body to be supported may also be used as the counterbalancing force. In these cases only one electromagnet is used in the relevant support direction.

In the device according to FIGS. 1 to 5, the electromagnets 13, 15 are located opposite one another on either side of the guide beam 1. It is noted that the electromagnets 13, 15 may also be otherwise located, i.e. with the U-shaped sides facing away from one another. In the latter case the pair 13, 15 is located between a first and a second part of the guide beam, the two parts being parallel.

Finally, it is noted that two degrees of freedom of the table 5 are suppressed by means of two pairs of electromagnets (13, 15) and (17, 19) in the device according to FIGS. 1, 2 and 3, viz. a translation parallel to the y-direction and a rotation about an axis extending parallel to the z-direction. If more pairs of electromagnets are used in such a device, more than two degrees of freedom of the body to be supported can also be suppressed. If a more compact construction of the device is required, the number of electromagnets used for the support may be reduced. This can be done, for example, by supporting the body in two directions by means of three electromagnets positioned at an angle of 120° relative to one another in a plane which is perpendicular to the said directions. An adapted control of the electromagnets is necessary for this with interlinked control circuits.

What is claimed is:

1. A device for positioning a body in at least one support direction relative to a support comprising:
   a body;
   at least one electromagnet for positioning the body relative to the support;
   at least one position sensor for producing an output signal manifesting the position of said body relative to said support; and
   electronic control means for said at least one electromagnet including 1) a control unit responsive to said at least one sensor output signal applied thereto for generating an electric control current at an output thereof as a function of the difference between a position of said body relative to said support and a reference position value and 2) a multiplier coupled to said control unit output and to said at least one electromagnet for controlling the at least one electromagnet, said multiplier being unique to said at least one electromagnet and for providing an electromagnet control signal whose value is determined by the product of the values of said output control current and said position sensor output signal.

2. The device as claimed in claim 1 further including a root extractor connected between the control unit and the multiplier for generating a root value signal manifesting a root value of the value of said control current.

3. The device as claimed in claim 1 including a pair of electromagnets, said body being supported in the support direction by said pair of electromagnets which, in the direction of support, are opposite one another, said control unit applying control currents to each said electromagnets, said control means including a second multiplier coupled to the control unit output and to a second of said electromagnets, and root extracting means coupled between the control unit and each said multipliers for generating a root value signal manifesting a root value of the value of said control current and for applying the root value signal to each said multipliers.

4. The device as claimed in claim 1 including a pair of electromagnets, said body being supported in the support direction by said pair of electromagnets which, in the direction of support, are opposite one another, said control unit applying control currents to each said electromagnets, said control means including a second multiplier coupled to the control unit output and to a second of said electromagnets, and rectifier means coupled between the control unit and each said multipliers.

5. The device of claim 4 wherein said rectifier means includes first and second rectifiers, the first rectifier coupled between the control unit and one of said multipliers and the second rectifier being coupled between the control unit and the other of said multipliers, said rectifiers being connected in electrical opposition relative to each other to the control unit and said one and other multipliers.

6. The device of claim 4 including a root extractor coupled between the control unit and each of the multipliers, said root extractor for generating a root value signal manifesting a root value of the value of said control current.

7. The device of claim 1 including two electromagnets and two position sensors, each sensor corresponding to a different electromagnet, said multiplier being coupled to the control unit and each electromagnet, further including a digital memory coupled between each of the multipliers and the position sensor corresponding to that multiplier.

8. The device of claim 1, in which during operation, the body is supported in a support direction by a pair of electromagnets, which in the support direction, are opposite one another, said control unit controlling currents through the pair, said control unit being common to the pair, said control means including two multipliers each coupled between the control unit and a different electromagnet, each of the multipliers being unique to the relevant electromagnet to which it is coupled and an electronic root extractor coupled between the control unit and each of the two multipliers.

9. The device of claim 1, in which during operation, the body is supported in a support direction by a pair of electromagnets, which in the support direction, are opposite one another, said control unit controlling currents through the pair, said control unit being common to the pair, said control means including two multipliers each coupled between the control unit and a different electromagnet, each of the multipliers being unique to the relevant electromagnet to which it is coupled and an electronic rectifier coupled between the control unit and each of the two electromagnets, the rectifiers each being unique to the relevant electromagnet to which it is coupled, the two rectifiers being electrically oppositely directed relative to the control unit.

10. The device of claim 9 including an electronic root extractor coupled between the control unit and the two multipliers, said extractor being in common to the two multipliers.

11. A device for positioning a body relative to a support comprising:
a body;
an electromagnet for positioning the body relative to the support;
a position sensor for producing an output signal manifesting the position of said body relative to said support; and
electronic control means responsive to said output signal applied thereto and including 1) a control unit for generating an electric current output control signal as a function of the difference between said position of the body relative to the support and a reference position value and 2) multiplier means coupled to said control unit and to said electromagnet, said multiplier means for providing an electromagnet control current whose value is determined by the product of the values of said output control signal and said position sensor output signal.

12. The device of claim 11 including a pair of electromagnets secured on opposing sides of the body, said multiplier means for providing a control signal for each said electromagnets and including means for causing only one of said electromagnets to receive a control signal in a given time period.

13. The device of claim 11 wherein said multiplier means includes first and second multipliers, each corresponding to a different electromagnet, said means for causing including rectifier means coupled between said control unit and said multipliers.

14. The device of claim 13 including two pairs of said electromagnets secured to said body and two control units each corresponding to a different pair.

15. The device of claim 14 including square root extracting means for generating a root signal manifesting the square root of the value of said control current and applying the square root signal to said multipliers.

* * * * *